United States Patent [19]
Ikeda

[11] 3,908,836
[45] Sept. 30, 1975

[54] APPARATUS FOR SUPPLYING SHEETS TO A SHEET PROCESSING MACHINE IN SUCCESSIVE STACKS

[76] Inventor: Takashi Ikeda, 270, Aza-Michihigashi, Kohiji, Yaizu, Shizuoka, Japan

[22] Filed: May 1, 1974

[21] Appl. No.: 465,933

[52] U.S. Cl............. 214/8.5 F; 214/8.5 SS; 271/4; 271/245
[51] Int. Cl.².................................... B65G 59/02
[58] Field of Search.......... 214/8.5 F, 8.5 SS, 8.5 A; 271/4, 10, 128, 130, 221, 245

[56] References Cited
UNITED STATES PATENTS

| 3,370,848 | 2/1968 | Bartlett............................. 271/221 |
| 3,690,650 | 9/1972 | Maier................................ 271/3.1 X |
| 3,815,762 | 6/1974 | Hoke.......................... 214/8.5 SS X |

OTHER PUBLICATIONS
Froula; IBM Technical Disclosure Bulletin; Document Feed; Vol. 15 No. 2 July, 1972.

Primary Examiner—Robert J. Spar
Assistant Examiner—George F. Abraham
Attorney, Agent, or Firm—Ladas, Parry, Von Gehr, Goldsmith & Deschamps

[57] ABSTRACT

For successively supplying sheets of corrugated paperboard or the like to a desired processing machine, a platform is slidably supported on one side of an upright support frame for up-and-down motion therealong. A stack of sheets to be supplied to the processing machine is deposited on the platform and is thereby raised toward a feed mechanism including an elongate push plate movable back and forth along an overhead guide beam extending horizontally rearwardly from the upright support frame. With each forward stroke of the push plate, a prescribed number of the sheets on the platform are forced in the form of a stack onto the rear end of a conveyor mechanism on the other side of the upright support frame via an aperture formed therethrough. Each stack of sheets thus loaded on the conveyor mechanism is readjusted into neat register by retractable stop members arranged adjacent the forward conveyor end and is thereafter unloaded therefrom onto a shelflike station appended to the processing machine.

5 Claims, 6 Drawing Figures

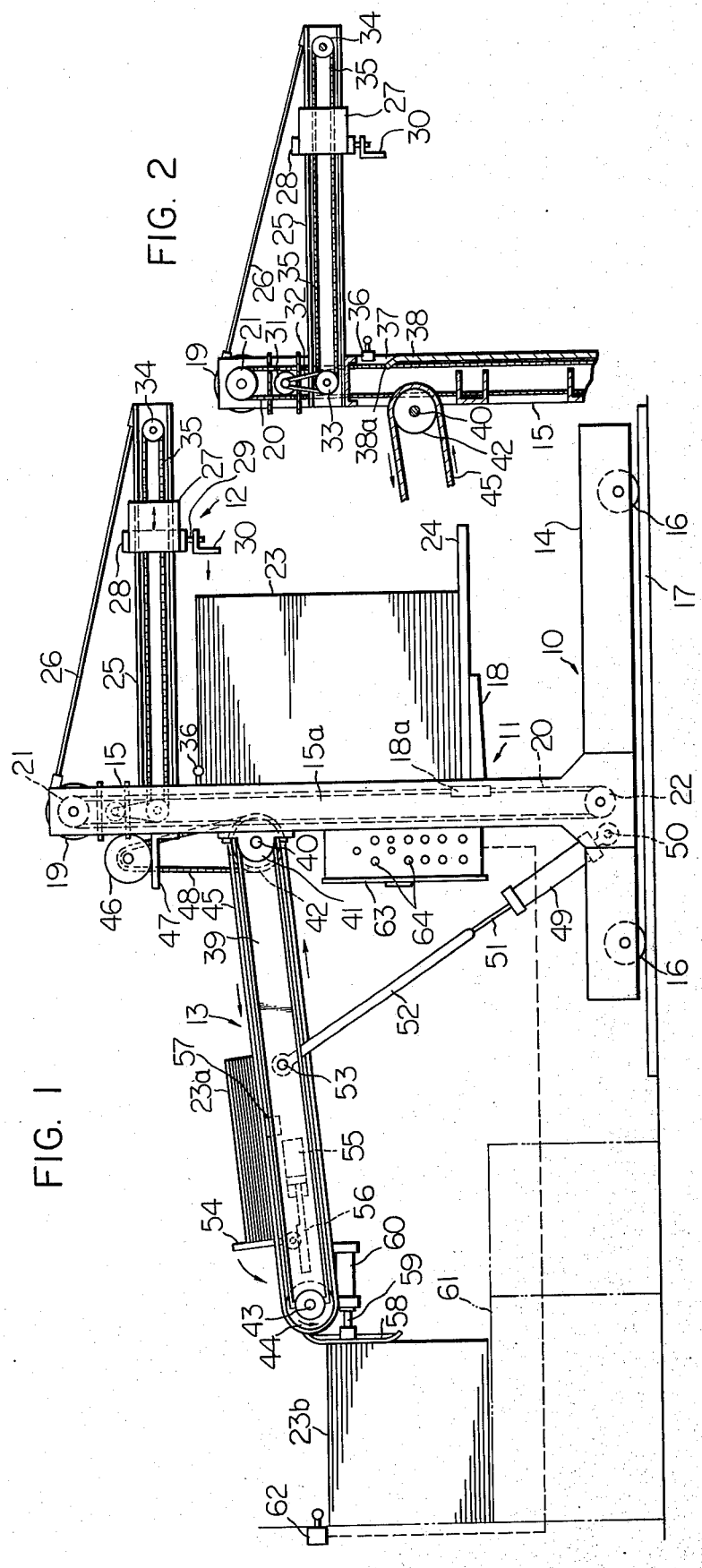

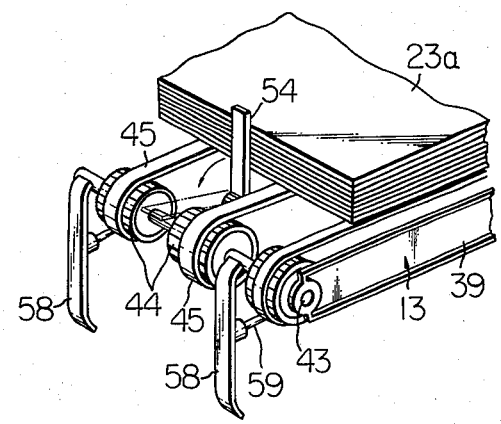
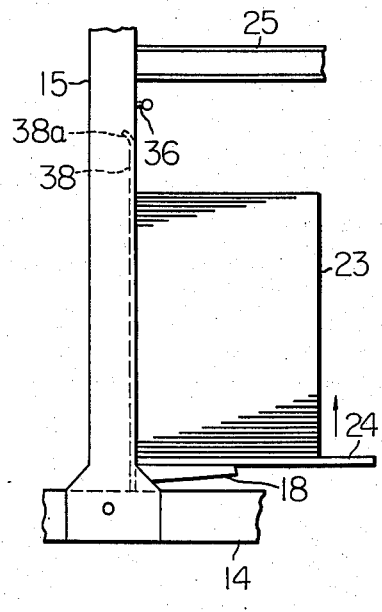
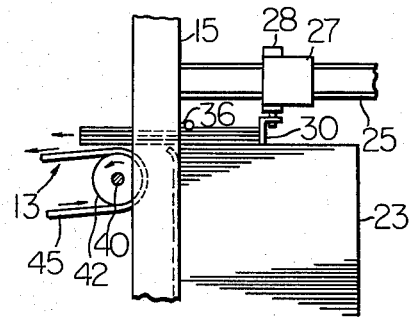
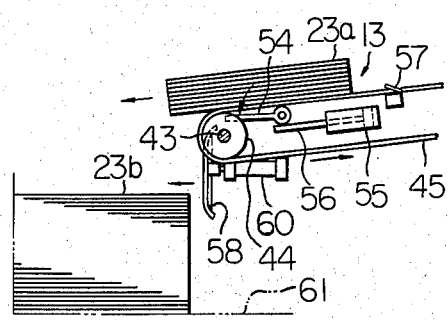

APPARATUS FOR SUPPLYING SHEETS TO A SHEET PROCESSING MACHINE IN SUCCESSIVE STACKS

BACKGROUND OF THE INVENTION

This invention relates to apparatus for continuously supplying sheets of corrugated paperboard or the like (hereinafter referred to simply as sheets) to a printing, slotting or like processing machine (hereinafter referred to as a sheet processing machine) in an automatic sequence.

In the art of manufacturing various corrugated paperboard products, there are many cases where the sheets of corrugated paperboard that have been previously cut to size must be supplied continuously to a desired sheet processing machine in large quantities. Heretofore, such sheets have usually been supplied by some manual means operating on a batch basis.

SUMMARY OF THE INVENTION

It is an object of this invention to provide apparatus for continuously supplying sheets to a desired sheet processing machine in an automatic sequence, such that little attention is required from an operator during its operation.

Another object of the invention is to provide apparatus which permits the sheets to be supplied to a sheet processing machine in the form of a neat stack.

A further object of the invention is to provide apparatus of simple, compact and durable construction which can easily be installed in a processing plant and which occupies a minimum of its floor space.

With these objects in view and the other objects hereinafter set forth, this invention provides sheet supplying apparatus including a platform slidably supported on one side of an upright support for vertical reciprocation therealong. Sheets to be supplied to a desired sheet processing machine are loaded in a stack on the platform while the same is held in its lowermost position and are thereby raised toward a feed mechanism supported adjacent the top of the upright support. The feed mechanism includes an elongate push member movably supported by an overhead guide means for horizontal reciprocation therealong, such that each time the push member travels toward the upright support, a predetermined number of the sheets on the raised platform are fed in the form of a relatively small stack onto one end of a conveyor mechanism on the other side of the upright standard via an aperture formed therethrough. The small stack of sheets is then transported toward the other end of the conveyor mechanism and is thence deposited onto suitable sheet receiving means of the processing machine. The foregoing procedure is repeated automatically until the platform is emptied.

The features are believed to be novel and characteristic of this invention are set forth with particularity in the appended claims. The invention itself, however, both as to its organization and mode of operation, together with the further objects and advantages thereof, will be best understood from the following description of a preferred embodiment taken in conjunction with the accompanying drawings wherein like reference characters denote corresponding parts of the several views.

BRIEF DESCRIPTION OF THE DRAWINGS

FIG. 1 is a side elevational view of sheet supplying apparatus constructed in accordance with the novel concepts of the invention;

FIG. 2 is a fragmentary vertical view of the apparatus of FIG. 1 illustrating its elevator and feed mechanisms;

FIG. 3 is a fragmentary perspective view of the apparatus of FIG. 1 illustrating its conveyor mechanism and sheet readjusting means; and FIGS. 4, 5 and 6 are fragmentary side elevational views explanatory of successive steps in the operation of the apparatus of FIG. 1.

DETAILED DESCRIPTION

With particular reference to FIG. 1, the apparatus according to this invention is essentially comprised of a frame 10, an elevator mechanism 11, a feed mechanism 12, and a conveyor mechanism 13. The frame 10 includes a horizontal base 14 and an upright support frame 15 of generally rectangular shape with a pair of opposite columns 15a. Preferably, the base 14 should be wheeled as indicated at 16 so that the entire apparatus is movable back and forth along rails 17 of suitable length laid out on the processing plant floor, for purposes hereinafter made apparent.

The elevator mechanism 11 includes a vertically reciprocable platform 18 extending horizontally with its rear side directed to the right in FIG. 1. The platform 18 has its left hand end slidably supported by the upright support frame 15 through a sliding member 18a for up-and-down motion therealong. The sliding member 18a is slidable, for example, in a vertical guide groove formed along the column 15a. The desired up-and-down motion of the platform 18 relative to the upright support frame 15 is effected by a reversible electric motor 19 via a chain-and-sprocket drive comprising an endless chain 20 extending around a pair of sprocket wheels 21 and 22 rotatably supported at or adjacent the top and bottom ends, respectively, of the column 15a of the upright support frame.

Although not clearly seen in FIG. 1, a pair of such chain-and-sprocket arrangements are provided adjacent the other column 15a of the upright support frame 15 for synchronous operation by the common reversible motor 19. The platform 18 is coupled through the sliding members 18a to the pair of endless chains 20. A stack of sheets 23 which has been loaded on this platform 18 via a pallet 24 in its lowermost position is thereby raised toward the feed mechanism 12.

The feed mechanism 12 includes a guide beam 25 extending horizontally rearwardly of the upright support frame 15 and disposed at right angles and in rigid connection therewith. The guide beam 25 is securely retained in position with the air of one or more braces 26. Slidably mounted on this guide beam 25 is a horizontally reciprocable carriage 27 supporting at least one hydraulic or pneumatic cylinder 28 (hereinafter referred to as the power cylinder). The power cylinder 28 has its piston rod 29 projecting vertically downwardly therefrom, to which there is affixed an elongate push plate 30 extending horizontally at right angles with the guide beam 25.

As illustrated in more detail in FIG. 2, the horizontal reciprocation of the carriage 27 and therefore of the push plate 30 along the guide beam 25 is effected by another reversible electric motor 31. The output shaft of this second motor 31 is operatively coupled via an endless chain 32 to a sprocket wheel 33 rotatably supported at the proximal end of the guide beam 25. Another sprocket wheel is arranged coaxially with the sprocket wheel 33 for simultaneous rotation therewith, and an endless chain 35 extends around this latter sprocket wheel and yet another sprocket wheel 34 rotatably supported at the free end of the guide beam. The carriage 27 is coupled directly to the one span of the endless chain 35.

A limit switch is mounted at 36 on the upright support frame 15 so as to be actuated by the uppermost one of the stacked sheets 23 on the vertically reciprocable platform 18 each time the uppermost sheet is forced into contact with the limit switch by the aforesaid elevator mechanism 11.

As best illustrated in FIG. 2, an aperture 37 is formed through the upright support frame 15 under the limit switch 36. The aperture 37 is elongated horizontally, over a distance sufficient to permit the sheets 23 to pass therethrough from the position on the vertically reciprocable platform 18 onto the conveyor mechanism 13. The vertical dimension of the aperture 37 may be determined in accordance with the thickness of each predetermined number of such sheets 23 to be fed successively onto the conveyor mechanism 13 by the feed mechanism 12. The lower extremity of the aperture 37 is delimited by the forwardly curved tips 38a of a plurality of guide strips 38 of stainless steel or the like which are arranged vertically along the rear side of the upright support frame 15 in parallel, horizontally spaced relationship to each other.

The conveyor mechanism 13 includes a pair of parallel spaced side frames 39 each swingably supported at one end thereby by a rotatable shaft 40 which is journaled in a pair of bearings 41 bolted or otherwise secured to the upright support frame 15. A plurality of spaced drive pulleys 42 are fixedly mounted on the rotatable shaft 40 between the bearings 41. Another rotatable shaft 43 extends between the other or forward ends of the side frames 39, and a plurality of space idler pulleys 44 are likewise fixedly mounted on this rotatable shaft 43. Extending around the respective associated pairs of drive and idler pulleys 42 and 44 are a plurality of endless conveyor belts 45 disposed in parallel spaced and coplanar relationship to each other, as best illustrated in FIG. 3.

A third electric motor 46 is mounted on a bracket 47 over the conveyor mechanism 13 to impart rotation to the shaft 40 and hence to the drive pulleys 42 via a chain-and-sprocket drive 48.

In order to adjust the angle of the conveyor mechanism 13 relative to the upright support frame 15, one or more, preferably two, power cylinders 49 are pivotally supported at 50 on the frame 10. Each of these power cylinders 49 has its piston rod 51 joined to a link 52 which is pivotally coupled at 53 to each of the conveyor side frames 39.

As seen in FIGS. 1 and 3, each predetermined number of sheets 23a being transported by the conveyor mechanism 13 are readjusted into a neat stack by means of a plurality of retractable stop members 54 positioned adjacent the forward end of the conveyor mechanism. The stop members 54 are aligned with respect to each other in the transverse direction of the conveyor mechanism 13. Each of the stop members 54 is operatively connected to a power cylinder 55 via a rack-and-pinion arrangement 56 so as to be turned between a substantially upright operative position shown in FIGS. 1 and 3 and an inoperative position under the upper runs of the endless conveyor belts 45. Each of these stop members 54 is normally held in the inoperative position and simultaneously turned to the operative position when a microswitch 57 shown in FIGS. 1 and 6 is actuated by each small stack of sheets 23a traveling thereover.

Also, as shown in FIGS. 1 and 3, a plurality of aligned adjustment plates 58 are provided at regular transverse spacings under the forward end of the conveyor mechanism 13. Each of these adjusting plates 58 is coupled to the piston rod 59 of a power cylinder 60 fixedly supported on the underside of the conveyor mechanism 13. Thus, as all the adjusting plates 58 are simultaneously thrusted forward by their respective power cylinders 60, the sheets 23b that have been unloaded from the conveyor mechanism 13 onto a stacking station 61 of a desired sheet processing machine can be rearranged into neat register.

A limit switch 62 is adapted to be actuated by the sheets 23b each time they are stacked up on the sheet processing machine station 61 to the level of the limit switch, with the result that the operation of the entire apparatus is held suspended until the height of the stacked sheets 23b becomes substantially lower than the limit switch level.

A control box 63 secured to the upright support frame 15 houses the various electrical controls of this apparatus. Arranged accessibly on this control box 63 are an array of pushbutton switches 64 by means of which the apparatus can be caused to operate either fully automatically or semiautomatically. It is to be understood, however, that all such electrical controls of the apparatus are considered familiar to those skilled in the art and do not constitute per se an essential feature of this invention.

In operation, each palletized stack of sheets 23 is first loaded on the vertically reciprocable platform 18 of the elevator mechanism 11, as by means of a forklift truck, when the platform is held in its lowermost position shown in FIG. 4. The platform 18 is then raised toward the feed mechanism 12 by the chain-and-sprocket drive operatively associated with the first motor 19 until the uppermost one of the sheets 23 actuates the limit switch 36. The first motor 19 is thereby stopped, while the second motor 31 is simultaneously started in rotation to initiate the forward stroke of the carriage 27 along the guide beam 25.

Thus, as illustrated in FIG. 5, a prescribed number of the sheets 23 are fed by the push plate 30 into the horizontally elongated aperture 37 of the upright support frame 15 and are loaded on the conveyor mechanism 13 in the form of a relatively small stack. The push plate 30 is then carried back to its initial position remote from the upright support frame 15. It is desirable that during this return stroke the push plate 30 is held raised closer to the carriage 27 by the power cylinder 28 in order to prevent its possible contact with the sheets 23 left on the platform 18.

The third motor 46 driving the conveyor mechanism 13 is assumed to be held in constant rotation during full automatic operation of the apparatus. The small stack of sheets 23a which has been loaded on the conveyor mechanism at its rear and as aforesaid is thereby immediately transported forwardly until the small stack actuates the microswitch 57, whereupon the power cylinders 55 become simultaneously operative to turn the stop members 54 upwardly via the respective rack-and-pinion arrangements 56. The forward travel of the small stack of sheets 23a is thus arrested by the stop members 54 as shown in FIGS. 1 and 3. Since the conveyor mechanism 13 is held in constant operation as above assumed, the sheets 23a can be rearranged into neat register as to their front and back by the stop members 54. The lateral readjustment of the sheets 23a may be effected as by a guide, not shown, arranged longitudinally of the conveyor mechanism 13 at least on one of its sides.

The stop members 54 are then turned to their inoperative position shown in FIG. 6 by their respective power cylinders 55, so that the small stack of sheets 23a can not be unloaded from the forward conveyor end onto the station 61 of the sheet processing machine. The power cylinders 60 are then simultaneously actuated to cause the forward thrust of the respective adjusting plates 58 thereby again rearranging the unloaded sheets 23b into a neat stack on the sheet processing machine extension 61.

The foregoing procedure is repeated until the sheets are stacked up on the processing machine station 61 to the level of the limit switch 62, whereupon the entire operation of the apparatus is suspended to allow the unloaded sheets 23b to be consumed by the sheet processing machine. As the height of the unloaded sheets 23b becomes substantially lower than the level of the limit switch 62, the operation of the apparatus is resumed, and the above procedure is repeated again until all the sheets 23 on the platform 18 of the elevator mechanism 11 are supplied to the sheet processing machine.

During the above described sheet supplying operation, the power cylinders 49 may be operated, either automatically or by manual depression of the pertinent pushbutton switch, in order that the forward end of the conveyor mechanism 13 may be held only slightly higher than the stack of unloaded sheets 23b on the sheet processing machine station 61. As previously mentioned, the entire apparatus can be moved back and forth along the rails 17 to adjust the position of the forward end of the conveyor mechanism 13 in accordance with the width of the sheets to be stacked up on the sheet processing machine station 61.

What is claimed is:

1. Apparatus for successively supplying sheets to a sheet processing machine, wherein said sheet processing machine is provided with sheet receiving means on which the sheets supplied by said apparatus can be successively stacked up, said apparatus comprising in combination:

I. a frame including an upright support having an aperture;

II. an elevator mechanism including
   a. a platform slidably supported on one side of said upright support for vertical reciprocation therealong, said platform being adapted to receive thereon a stack of sheets to be supplied to said sheet processing machine, and
   b. first drive means for causing said platform to reciprocate vertically along said upright support;

III. a sheet feed mechanism including
   a. a guide beam extending horizontally at said one side of the upright support and located above said platform of said elevator mechanism,
   b. a carriage slidably mounted on said guide beam for horizontal reciprocation therealong,
   c. a push member supported by said carriage, and
   d. a second drive means for causing said carriage to reciprocate horizontally along said guide beam, whereby each time said push member travels forwardly toward said upright support from the remote end of said guide beam, a prescribed number of sheets on said platform can be fed in the form of a stack into and through said aperture formed through said upright support;

IV. a conveyor mechanism including
   a. parallel spaced side frames supported on the other side of said upright support,
   b. a plurality of parallel space endless belts extending in coplanar relationship around terminal pulleys rotatably supported at both ends of said side frames, said endless belts being adapted to receive at one extremities thereof each prescribed number of sheets delivered through said aperture of said upright support by said feed mechanism, and
   c. third drive means for causing said endless belts to move around said terminal pulleys, whereby each prescribed number of sheets loaded on said endless belts at one extremities thereof are thereby transported toward the other extremities;

V. a plurality of stop members pivotally supported at their proximal ends on said conveyor mechanism adjacent said other extremities of said endless belts and aligned with respect to each other transversely of said conveyor mechanism, each of said stop members being pivotable between an upright position above the upper runs of said endless belts in which each prescribed number of sheets being transported by said conveyor mechanism is prevented from being fed by the conveyor mechanism, and a lying position in whichc it is swung toward said other extremities of said endless belts under the upper runs of the same;

VI. sheet stack detecting means provided on said conveyor mechanism upstream of said stop members to detect said prescribed number of sheets being transported on said endless belts to send a detection signal; and VII. power means responsive to said detection signal to swing each of said stop members from its lying position to its upright position so as to temporarily arrest and stop said prescribed number of sheets being transported to readjust the same into a neat stack, said power means being swung thereafter into said lying position to allow said prescribed number of sheets to advance further to be unloaded onto said sheet receiving means.

2. The apparatus as recited in claim 1 wherein said push member is supported by said carriage via means permitting up-and-down motion of said push member relative to said carriage, whereby said push member can be held in its depressed position during the forward travel of said carriage toward said upright support and in its elevated position during the return travel of said carriage away from said upright support.

3. The apparatus as recited in claim 1 wherein said side frames of said conveyor mechanism are swingably suppported on said other side of said upright support, and wherein the apparatus includes means for adjusting the angle between said conveyor mechanism and said upright support in accordance with the height of the sheets stacked on said sheet receiving means of said sheet processing machine.

4. The apparatus as recited in claim 1, further comprising a plurality of adjusting member disposed under said conveyor mechanism at said other extremity of said conveyor belts, said adjusting member being aligned with respect to each other transversely of said conveyor mechanism, and means for simultaneously moving said adjusting plates back and forth relative to said conveyor mechanism, whereby the sheets unloaded from said conveyor mechanism onto said sheet receiving means of said sheet processing machine can be readjusted into a neat stack.

5. The apparatus as recited in claim 1, wherein said frame further includes a wheeled base.

* * * * *